No. 684,964. Patented Oct. 22, 1901.
G. W. WEBB.
CAR FENDER.
(Application filed July 12, 1901.)
(No Model.)

Witnesses:
F. W. Dueuckel.
Alfred A. Ricke.

Inventor:
Geo. W. Webb.
by Higdon & Longan.
Attorneys.

THE NORRIS PETERS CO., PHOTO-LITHO., WASHINGTON, D. C.

UNITED STATES PATENT OFFICE.

GEORGE W. WEBB, OF ST. LOUIS, MISSOURI.

CAR-FENDER.

SPECIFICATION forming part of Letters Patent No. 684,964, dated October 22, 1901.

Application filed July 12, 1901. Serial No. 68,034. (No model.)

*To all whom it may concern:*

Be it known that I, GEORGE W. WEBB, of the city of St. Louis, State of Missouri, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

Figure 1:
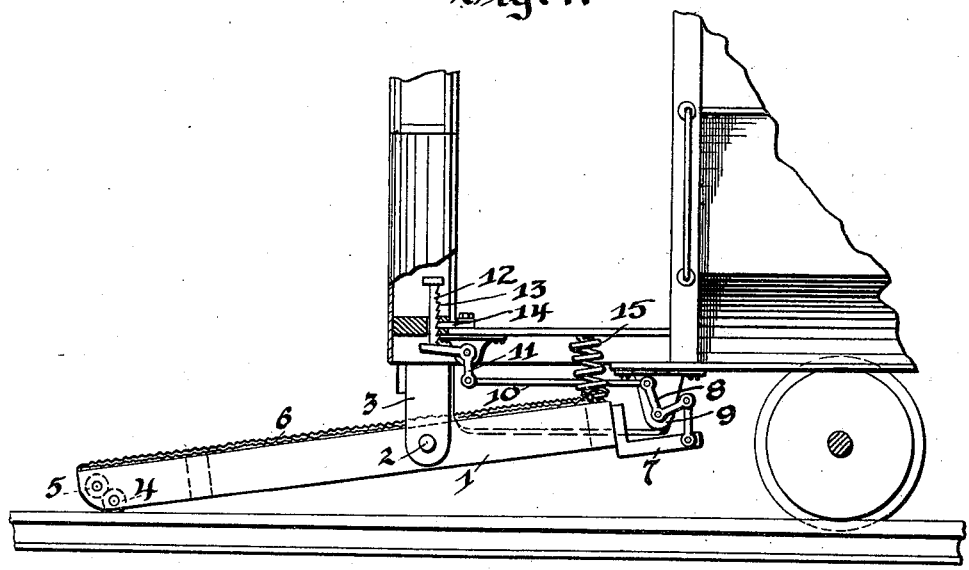
Figure 2:
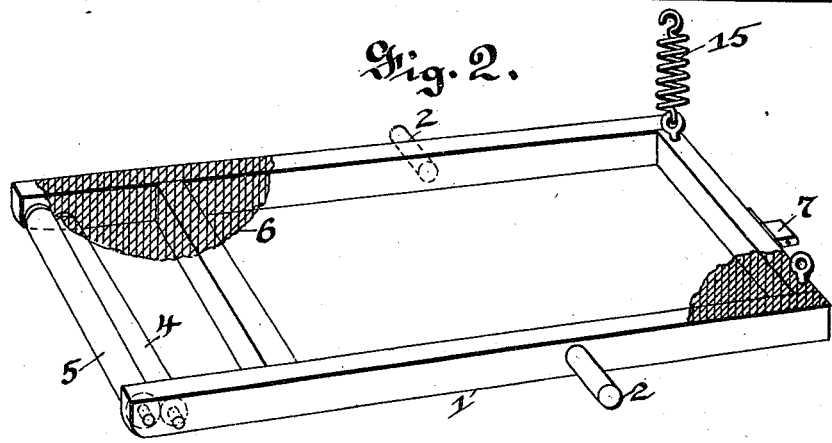
Figure 3:
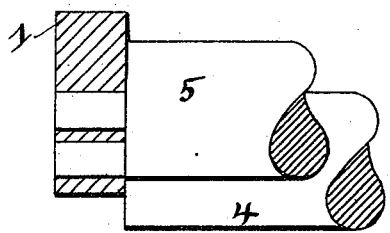

Figure 1 is a view showing the fender attached to a car. Fig. 2 is a perspective view of the frame of the fender. Fig. 3 is a detail view, showing the arrangement of the rollers at the forward end of the fender.

My improved fender consists of a frame 1, adapted to extend a suitable distance under the car-body and provided with pivot-pins 2, whereby it may be attached to the supports 3, connected to the under side of the car. At the forward end of the fender is a roller 4, which is intended to operate upon the track, and above said roller 4 is another roller 5, which bears upon the said roller 4 and is turned thereby when the forward end of the fender is lowered. When the roller 5 is turned in this manner, the forward side thereof moves upwardly and has a tendency to elevate or raise objects with which it comes in contact upon the upper side of the fender instead of throwing them under the fender, as would occur were the object permitted to strike against the roller 4 turned by operating upon the street-surface or track.

6 indicates the upper part of the fender, which may be of netting, as shown, or it may be composed of transverse or longitudinal strips or other suitable material. As above stated, the fender extends underneath the car a suitable distance and the operating connections are connected to the rear end of the fender and afford means whereby the fender may be raised or lowered at will, and these operating devices are under the immediate control of the motorman. An arm or extension 7 is connected to the end of the fender, and a bell-crank 8, supported by means of a suitable attachment 9, is connected to the said extension 7 either directly or by means of an interposed rod, as shown in Fig. 1. A rod 10 is connected to the upper end of the bell-crank 8, and the forward end of the said rod 10 is connected to another bell-crank 11, supported underneath the car-body, as shown in the drawings.

12 indicates a rod which is mounted within an opening in the bottom of the car, and the lower end of the said rod rests upon the horizontal arm of the bell-crank lever, and on one side of the said rod are formed ratchet-teeth 13, which are engaged by the pawl 14, pivoted to the car-floor. Springs 15 have their lower ends attached to the rear end of the fender and their upper ends connected to the under side of the car, and the tendency of the said springs is to draw the end of the fender upwardly, and thereby lower the forward end of the fender upon the track, as shown in Fig. 1. This can occur only when the ratchet-teeth 13 are disengaged from the pawl 14, because when the pin 12 is held downwardly to operate the bell-crank 11 and the connections interposed between the same and the end of the fender it is clear that the rear end of the fender will be lowered and the forward end raised, in which position it may be held as long as desired and while the pawl 14 engages the teeth 13.

When the motorman desires to lower the fender to the track, he disengages the pawl 14 from the teeth 13, which permits the springs 15 to move, and thereby raise the rear end of the fender, throwing the forward end downwardly upon the track. By means of these connections the fender may be carried in a horizontal position, and thereby saved from all injury by unnecessary use, and can be instantly lowered to the track by releasing the pawl 14 and permitting the springs 15 to move as described. The upper roller 5 being turned by the roller 4, which operates directly upon the street-surface or track, assists in raising the objects on the fender.

I claim—

1. A fender, consisting of a frame pivotally connected to the car and extending under the end thereof, a roller 4 at the forward end of the fender-frame and adapted to operate upon the street-surface or track, and a second roller 5 operated by the said roller 4, in combination with retractile springs connected to the rear end of the fender and to the under side of the car and adapted to raise the rear end of the fender and thereby lower the forward end, a rod connected to the rear end of the fender whereby the fender may be moved to a horizontal position, and a lock for holding the said rod and thereby the fender in different adjustments, substantially as specified.

2. In a car-fender, a frame pivotally supported under the end of the car, a roller at the forward end of the frame and adapted to operate upon the street-surface or track, a second roller operated by the first-mentioned roller, springs connected to the rear end of the fender and to the under side of the car and adapted to lower the forward end of the fender onto the track, a bell-crank connected to the rear end of the fender-frame, a rod connected to said bell-crank, a second bell-crank pivoted to the said rod, a pin mounted in an opening in the car-floor and having its lower end upon the second-mentioned bell-crank and affording means for operating the same and the other devices mentioned, and a pawl adapted to engage with said pin for holding the fender in different positions, substantially as specified.

In testimony whereof I affix my signature in presence of two witnesses.

GEORGE W. WEBB.

Witnesses:
ALFRED A. EICKS,
F. W. DUENCKEL.